United States Patent [19]

Prince et al.

[11] Patent Number: 4,817,560
[45] Date of Patent: Apr. 4, 1989

[54] LITTER BOX SIFTER

[76] Inventors: Darrell E. Prince; Jean Wimberly, both of P.O. Box 305, Bergman, Ark. 72615; Jay B. Taylor, P.O. Box 1568, Harrison, Ark. 72602

[21] Appl. No.: 138,571
[22] Filed: Dec. 28, 1987
[51] Int. Cl.$^4$ ................................................ A01K 1/00
[52] U.S. Cl. ......................................................... 119/1
[58] Field of Search ............................................. 119/1

[56] References Cited

U.S. PATENT DOCUMENTS 4,646,684  3/1987  Embry ..................................... 119/1

Primary Examiner—Robert Peshock
Attorney, Agent, or Firm—Robert R. Keegan

[57] ABSTRACT

There is disclosed a litter box with sifter apparatus for convenient cleaning and servicing of a pet litter box wherein the sifter element is in the form of a basket with a gridlike construction of molded rigid plastic and sloping sides. The grid of the basket is formed of bars of triangular cross-section, each such bar being oriented with the flat side facing the interior of the basket and the apex of the triangle pointing outwardly or downwardly. Spacing between the bars is such that kitty litter will fall through the bars into a conventional litter box, and, using a knifelike action of the triangular bars, the basket may be pressed back into the litter in the litter box after using the basket to remove solid waste. A frame around the top of the basket rigidifies the structure and serves as a handle on each end of the basket which is provided with openings for hand holds. Support bars are optionally included around the side of the basket and across the bottom of the basket transverse to the grid forming bars, and these also are preferably of triangular cross-section.

12 Claims, 2 Drawing Sheets

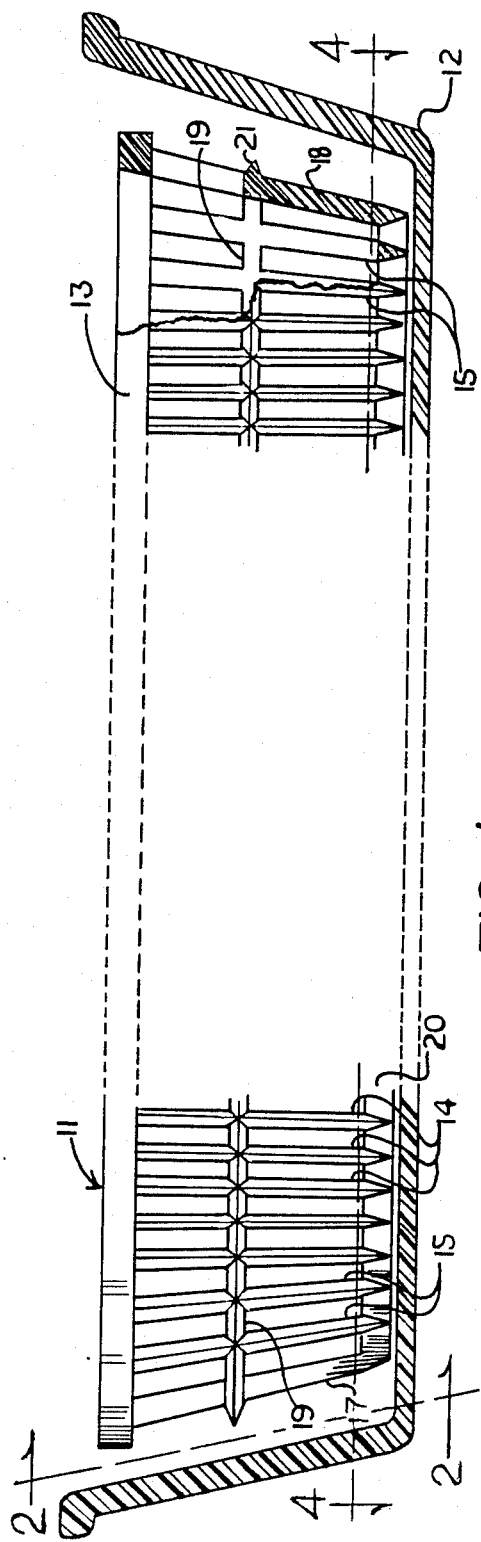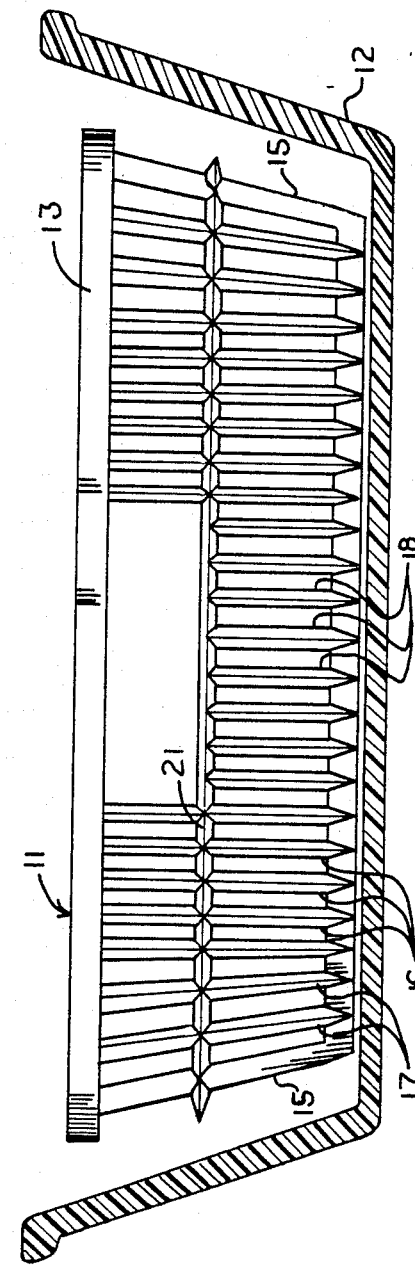

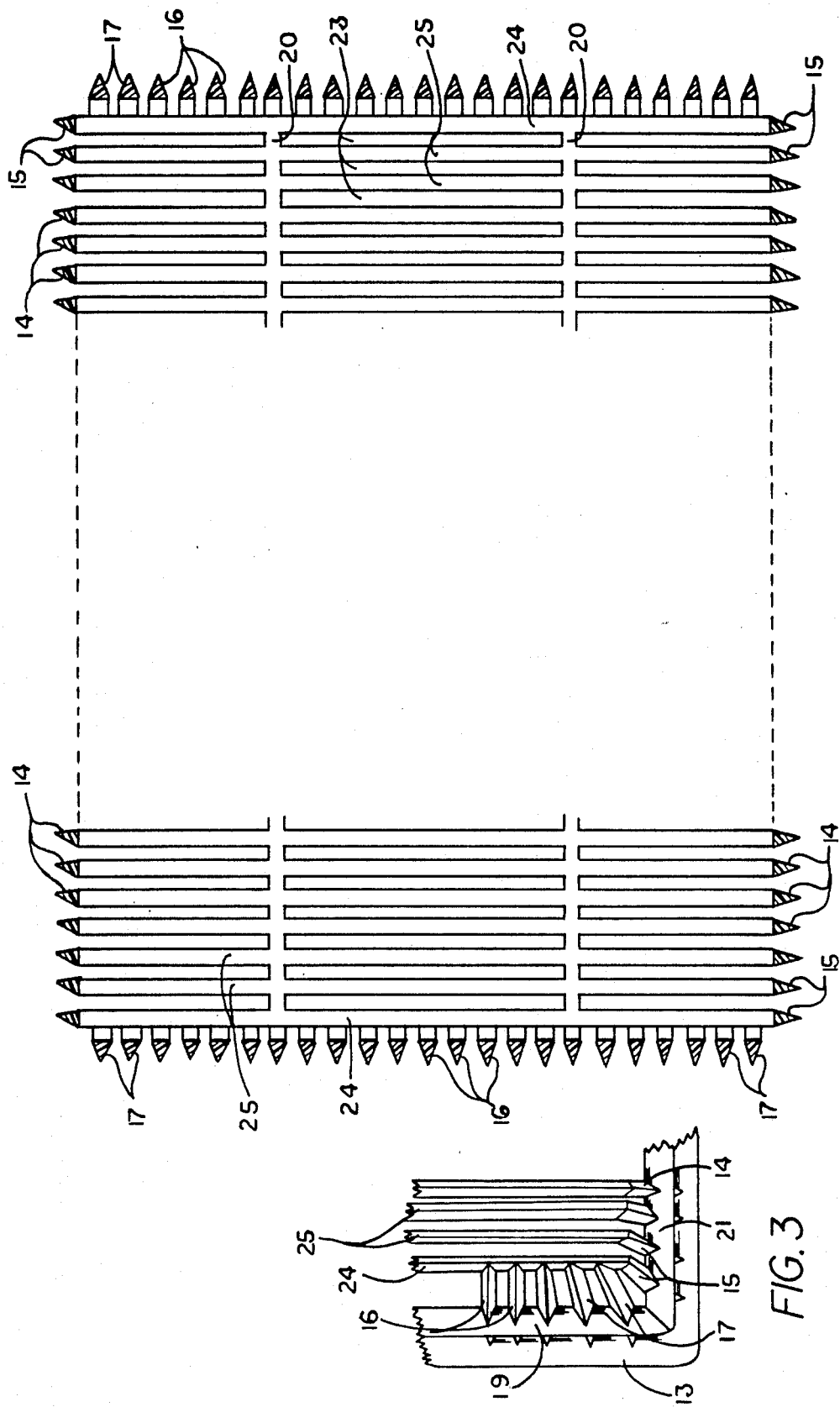

LITTER BOX SIFTER

The present invention relates to apparatus for cleaning and servicing a cat litter box and more particularly to the apparatus and method of the present invention for sanitary removal of solid waste from a cat litter box while preserving the cat litter for reuse, thereby eliminating unnecessary wastefulness of cat litter.

It is of course, well known to provide a sanitary facility for a cat, or other small pet, consisting of a box which may be approximately 20 inches by 16 inches, for example, and which is typically filled to a depth of one inch or more with artificially produced granular material simulating fine gravel, and commonly referred to as kitty litter. The litter box provides a relief station for the cat thereby avoiding damage to rugs or floors, and the kitty litter is discarded and replaced as necessary or desired.

The present invention provides a simple, effective and sanitary way of removing solid waste from the litter box superior to previous expedients employed.

Generally the use of a screen or sifting device of some sort has been proposed by others for separating solid waste from kitty litter. The more practical of such proposals has involved the use of two containers and a sifter with the separation or sifting operation involving transfer of the litter from one container to the other. Such as arrangement is shown in U.S. Pat. No. 4,325,325 to Waynne D. Larter, issued Apr. 20, 1982, class 119/1. Larter discloses a first container 5 and a second similar container 20 together with a separator 12 with a "rectangularly shaped foraminous central portion 13". Larter teaches to assemble container 5, separator 12 and container 20 stacked one on the other, and to invert the assembly to transfer the litter to container 20 while trapping the solid waste with separator 12. The complications of this arrangement and method are avoided by the present invention as will later be explained.

Similar approaches are shown involving two imperforate containers together with a screen, or sifter, are shown in other patents such as U.S. Pat. No. 4,217,857 to Joseph D. Geddie, issued Aug. 19, 1980, class 119/1; U.S. Pat. No. 4,325,822 to John H. Miller, issued Apr. 20, 1982, class 119/1; and U.S. Pat. No. 3,752,120 to Sam W. Pallesi, issued Aug. 14, 1973, class 119/1. None of the above patents, or other known prior disclosures, show apparatus according to the present invention wherein only a single imperforate container or litter box is required and a sifting apparatus in the form of a gridlike structure is provided which has knifelike grid elements so that it can be readily pressed downward into position in the bottom of the litter box again after it has been used to remove solid waste from the litter. In accordance with the present invention no transfer of the litter from one container to another is required, and only minimal disturbance of the body of litter is necessary.

The preferred sifter structure according to the present invention is basketlike in nature and conforms generally to the inside of a conventional litter box with which it is to be used. It differs in that it is unnecessary to place the sifter in the bottom of the litter box before filling the sifter and box with kitty litter granules. Rather, the structure of the sifter is such that the grid of which it is formed at least on the bottom surface has bars of triangular cross-section so that one readily may press the sifter back down into a body of kitty litter granules in the bottom of the litter box whereby the granules are displaced up through the elongated interstices between grid elements to provide a suitable layer of kitty litter within the sifter basket. When it is desired to remove solid waste the sifter basket is lifted to allow the litter granules to drop into the kitty litter box while the waste is carried in the basket to be disposed of in an appropriate manner. If necessary the basket may be rinsed or otherwise cleaned before replacement. The operation of pressing the sifter basket down to bottom in the litter box is then repeated to prepare the arrangement for further use.

It will be noted that the litter box sifter according to the invention is completely effective even though the solid waste is not on the surface of the kitty litter, but is partly or entirely buried.

The litter box sifter being formed primarily of V-shaped bars allows the litter box sifter to cut back down into the kitty litter, whereas this would be very difficult, or impossible, with a screen or grid of conventional construction as shown in descriptions and illustrations of prior devices.

The sifter basket is preferably constructed of dense rugged plastic and formed by molding in one unitary piece. By way of example, the sifter basket may have a height of three and three-quarters inches, a width of 13 inches and a length of 17 inches with the sides of the basket tapered about one inch on each side to slightly smaller dimensions at the bottom. The grid in the bottom of the basket is formed of V bars of triangular cross-section which may have a width, for example, of one-quarter inch and a depth of three-eighths inches. The spacing between V bars in the bottom grid is preferably about one-quarter inch, but in any case will conform to the granules of kitty litter with which it is to be used. That is the interstices will have a minimum dimension at least slightly greater than the maximum granule size.

Preferably the long sides of the basket are also formed of similar V bars which may be a continuation of the bottom V bars to increase the facility with which the basket may be pressed into the litter to or near the bottom of the litter box.

Side support V bars may be located approximately one and onequarter inches from the top of the sifter basket on any or all sides of the basket. Bottom support bars may also be provided running lengthwise of the basket and spaced apart by about one-third the width of the basket.

In addition to providing the features and advantages described above, it is an object of the present invention to provide a litter box sifter for removing solid waste from a cat litter box in an effective and sanitary manner wherein a sifter basket is utilized in a litter box or conventional form and is structured to be readily pressed into the litter granules of the litter box thereby avoiding the necessity of transferring the litter granules from the box in order to emplace the sifter basket.

It is another object of the present invention to provide a sifter basket for a litter box comprising a grid of V bars of triangular cross-section capable of cutting down into the body of kitty litter in the litter box to emplace the sifter basket substantially bottomed in the litter box.

It is still another object of the present invention to provide such a sifter basket and litter box wherein the sifter basket conforms generally to the internal dimensions of the litter box and may be placed to rest substantially in the bottom of the litter box after the litter box has been partially filled with conventional litter granules.

Other objects and advantages of the present invention will be apparent from consideration of the following description in conjunction with the appended drawings in which:

FIG. 1 is a side elevational view partially in section of a litter box sifter apparatus according to the invention;

FIG. 2 is a vertical sectional view taken along the line 2—2 in FIG. 1;

FIG. 3 is a fragmentary bottom plan view thereof; and

FIG. 4 is a horizontal sectional view taken along the line 4—4 in FIG. 1.

Referring now to the drawings, and particularly to FIG. 1, cat litter box apparatus 11 is shown including a generally conventional litter box 12 of rigid or semirigid plastic material and a litter sifting basket 9. The litter sifting basket 9 is preferably formed of Lexan, ABS, PVC, UHMW, Nylon, Polystyrene, or other rigid, substantially unbreakable plastic by molding in one unitary piece. Alternatively, it may be molded in a relatively small number of pieces and assembled in snap-together fashion.

As seen in FIG. 1 or 2, the basket 9 generally conforms to the inside dimensions of the tray 12. A rectangular frame 13 of solid rectangular cross-section has joined thereto and extending downwardly therefrom a plurality of bars 14, 15, 16, and 17 with the apex of the V of each bar cross-section pointing outwardly from the center of the basket 9.

Support bars 19 and 21 on the long and short sides of the basket respectively, serve to join adjacent bars 14, 15, 16, or 17 together and lend rigidity to the basket structure. Support bars 19 and 21 are spaced down approximately one-third of the way (about one and one-quarter inches) from the top of the basket in the preferred embodiment. As best seen in FIG. 2 some vertical bars 18 do not extend to the top frame 13 and a hand hold is thereby provided for convenient lifting of basket 9 by frame 13 at the ends thereof. This is also shown at the broken away portion on the right of FIG. 1 showing a partial mid-section of basket 9.

Vertical triangular or V-shaped bars 14, 16, and 18 near the midportion of the long and short sides of the basket are parallel, whereas bars 15 and 17 near the corners of the basket are preferably sloped in at the bottom to better preserve the spacing between bars near the corners of the basket. In addition the bars 15 and 17 may have a cross-section tapered to the lower portion so that the width of the interstices between bars is maintained nearly equal throughout.

The bottom of the basket is primarily formed by a plurality of similar V-shaped, or triangular bars 25 extending across the shorter dimensions of the basket 9. In the preferred embodiment bars 25 are molded as a continuation of vertical bars 14 and 15 all as seen in FIGS. 3 and 4, for example. The joinder of side and bottom bar portions may be more or less rounded. Preferably the bottom of the basket is rendered more rigid by one or more (in this case two) support bars 20 extending at right angles to bars 25 and joining adjacent ones of them together. Bars 20 are also preferably V-shaped or of triangular cross-section with the V apices pointing downward.

The interstices 23 between bars 25 are preferably about one-quarter inch in width and several inches in length determined by the spacing of support bars 20. The lesser dimension of interstices 23 is determined to be slightly greater than the largest dimension of the kitty litter or other granules which are to pass through the grid of bars in the sifting operation. The V bars have a V width of one-quarter inch and height of three-eights inch. Somewhat larger or smaller height-to-width ratios may be employed for the bars if desired. As illustrated support bars 19 and 21 have a slightly greater V height. Frame 13 may be one-half inch square. While all four sides of the basket are shown with a grid structure suitable for sifting the kitty litter, it is apparent that the major portion of the sifting operation is accomplished by the bottom of the basket and one or more sides of the basket could be of solid construction. The grid structure on the sides of the basket does, however, facilitate forcing the basket into the kitty litter by permitting a reciprocating motion to work the basket down to, or near, the bottom of the tray 12. Also at least one of the sides of the basket could be left open if desired and this would permit ejection of the solid waste by slightly tipping the basket.

Use of the apparatus will be carried out by placing the tray 12 in the desired location with the basket 9 therein as shown in FIG. 1 or FIG. 2, and filling the basket and tray with at least about one inch of kitty litter, but preferably not more than two-thirds the depth of the basket 9. Alternatively the litter may be placed in the tray 12 and the basket pressed down through the litter to a position at, or near, the bottom of the tray 12.

When it becomes desirable to remove solid waste from the litter box, the basket 9 may be carefully lifted by grasping the frame 13 at the hand openings to allow the litter to sift through the bottom and/or sides of the basket and to be caught by the tray 12. The waste may be dumped into sanitary disposal means by tipping or inverting the basket or may be removed using other sanitary disposal means. Little or no handling or the solid waste requiring gloves or tools is required. On occasions when it is desired to clean the basket before replacing it in the litter box the open grid work facilitates rinsing the basket. Also the interior of the basket has smooth, flush surfaces which may readily be wiped clean.

The basket 9 may conveniently be returned to the litter box by pressing the basket into the litter while holding the frame at the two ends since the knifelike action of the bars cuts into the loose kitty litter with minimal resistance. Back and forth reciprocating motion of the bottom f the basket may be employed to hasten the litter granules passage upwardly through the interstices of the basket. Once the basket has been returned to its original position near the bottom of the tray 12, the litter box apparatus is again ready for use. Whenever desired the used litter may be discarded and fresh clean litter placed in the litter box to reinitiate the process described above.

It may be noted that support bars 19, 20, and 21 may in some cases be unnecessary or alternatively a greater number of bars for more rigidity may be desired. Although the sloping sides of the basket are a desirable feature, they are not essential to the function of the device so that a simpler straight sided arrangement could be provided if desired. In such case, all bars 14, 16, and 18, on the sides would be vertical and no sloped bars such as 15 or 17 would be required. Also the opening provided by the truncated bars 18 could be either larger or smaller or eliminated without negating the utility of the apparatus.

In addition to the variations and modifications of the apparatus described or suggested above other variations and modifications will be apparent to those skilled in the art, and accordingly the scope of the invention is not to be considered limited to the particular embodiments shown, described or suggested, but is rather to be determined by reference to the appended claims.

What is claimed is:

1. Pet litter box with cleaning apparatus comprising a liquid impervious tray, and
a litter sifting basket slightly smaller than said tray and of rigid material with a generally flat bottom portion adjoined by at least two sides,
said bottom portion being formed of an array of parallel bars with generally triangular cross-sections,
said bars being supported at least in part from said sides and being spaced apart to form elongated interstices therebetween with a transverse dimensions of about 3/16 inch to ⅜ inch,
the sides of said basket being formed of parallel bars which are a continuation of said array of parallel bars forming the bottom portion of said basket.

2. Apparatus as recited in claim 1 wherein two of said at least two sides are formed of an array of parallel bars with generally triangular cross-sections.

3. Apparatus as recited in claim 1 wherein said sides are sloped causing the dimension of the upper portion of said basket to be greater than that of the lower portion.

4. Apparatus as recited in claim 1 wherein the horizontal dimension of said triangular cross-sections is less than the vertical dimension thereof.

5. Apparatus as recited in claim 1 further including a rectangular frame around the top of said basket joined to the top portion of said sides.

6. Apparatus as recited in claim 5 wherein at least two of said sides have truncated portions leaving openings for hand holds between said frame and said truncated side portions.

7. Pet litter box with cleaning apparatus comprising a liquid impervious tray, and
a litter sifting basket slightly smaller than said tray and of rigid material with a generally flat bottom portion adjoined by at least two sides,
said bottom portion being formed of an array of parallel bars with generally triangular cross-sections,
said bars being supported at least in part from said sides and being spaced apart to form elongated interstices therebetween with a transverse dimension of about 3/16 inch to ⅜ inch,
a rectangular frame around the top of said basket joined to the top portion of said sides,
at least two of said sides having truncated portions leaving openings for hand holds between said frame and said truncated side portions.

8. Pet litter box with cleaning apparatus comprising an open top liquid impervious tray, and
a litter sifting basket slightly smaller than said tray and of rigid material with at least three sides and a generally flat bottom portion adjoined by the sides,
said bottom portion and at least part of said sides being formed of an array of parallel bars with generally triangular cross-sections,
said bars being supported from said sides and spaced apart to form elongated interstices therebetween with a transverse dimension of about 3/16 inch to ⅜ inch,
said sides being sloped causing the dimension of the upper portion of said basket to be greater than that of the lower portion.

9. Apparatus as recited in claim 8 wherein the horizontal dimension of said triangular cross-sections is less than the vertical dimension thereof.

10. Apparatus as recited in claim 8 wherein the sides of said basket are formed of parallel bars which are a continuation of said array of parallel bars forming the bottom portion of said basket.

11. Apparatus as recited in claim 8 further including a rectangular frame around the top of said basket joined to the top portion of said sides.

12. Apparatus as recited in claim 11 wherein at least two of said sides have truncated portions leaving openings for hand holds between said frame and said truncated side portions.

* * * * *